United States Patent
Zeira et al.

(10) Patent No.: US 6,850,500 B2
(45) Date of Patent: Feb. 1, 2005

(54) TRANSMISSION POWER LEVEL ESTIMATION

(75) Inventors: Eldad Zeira, Huntington, NY (US); Guodong Zhang, Ronkonkoma, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 798 days.

(21) Appl. No.: 09/855,268

(22) Filed: May 15, 2001

(65) Prior Publication Data

US 2002/0181550 A1 Dec. 5, 2002

(51) Int. Cl.$^7$ ................................................. H04G 7/00
(52) U.S. Cl. ........................ 370/328; 370/310; 370/342; 455/7; 455/13.4
(58) Field of Search ................................. 370/310, 328, 370/342, 343, 344, 345; 455/7, 13.4, 522, 574, 127.1

(56) References Cited

U.S. PATENT DOCUMENTS

| | | |
|---|---|---|
| 5,987,333 A | 11/1999 | Sole |
| 6,175,745 B1 * | 1/2001 | Bringby et al. ............. 455/522 |
| 6,192,249 B1 | 2/2001 | Padovani |
| 6,498,934 B1 * | 12/2002 | Muller ........................ 455/450 |

FOREIGN PATENT DOCUMENTS

| | | |
|---|---|---|
| EP | 0936753 | 8/1999 |
| EP | 1063788 | 12/2000 |
| EP | 1176730 | 1/2002 |
| WO | 9707600 | 2/1997 |
| WO | 0162032 | 8/2001 |

* cited by examiner

Primary Examiner—Wellington Chin
Assistant Examiner—Raj Jain
(74) Attorney, Agent, or Firm—Volpe and Koenig, P.C.

(57) ABSTRACT

A model for noise rise of users in relation to an interference measure, a pathloss and a desired signal to interference ratio is provided. For a selected user, a pathloss, an interference measure and a desired signal to interference ratio is determined. A noise rise for the selected user is determined using the determined interference measure, pathloss, desired signal to interference ratio and the noise rise model. The selected user transmission power level is estimated using the determined noise rise.

20 Claims, 6 Drawing Sheets

```
                                    80
    ┌──────────────────────────────────────────────────────────┐
    │ MODEL NOISE RISE AS A VARIABLE DEPENDENT ON PATHLOSS,    │
    │   THE MEASURED INTERFERENCE AND THE SIR TARGET           │
    └──────────────────────────────────────────────────────────┘
                             │        82
    ┌──────────────────────────────────────────────────────────┐
    │              RECORD THE NOISE RISE MODEL                 │
    └──────────────────────────────────────────────────────────┘
```

FIG. 7

```
                                    84
    ┌──────────────────────────────────────────────────────────┐
    │     ESTIMATE NOISE RISE USING A CONSERVATIVELY HIGH      │
    │           STIPULATED VALUE FOR THE PATHLOSS              │
    └──────────────────────────────────────────────────────────┘
```

TRANSMISSION POWER LEVEL ESTIMATION

BACKGROUND

The invention generally relates to wireless communication systems. In particular, the invention relates to estimating transmission power levels in such systems.

Figure 1:
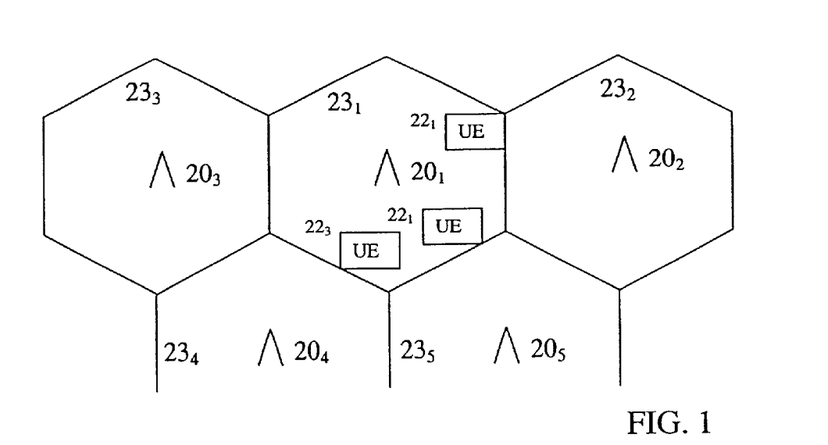
FIG. 1 is an illustration of a physical layout of a wireless communication system.

FIG. 1 depicts a physical layout of a wireless communication system. The system has a plurality of base stations 20. Each base station 20 communicates with user equipments (UEs) 22 in its operating area or cell 23. Communications transmitted from the base stations 20 to the UEs 22 are referred to as downlink communications and communications transmitted from the UEs 22 to the base stations 20 are referred to as uplink communications.

Figure 2:
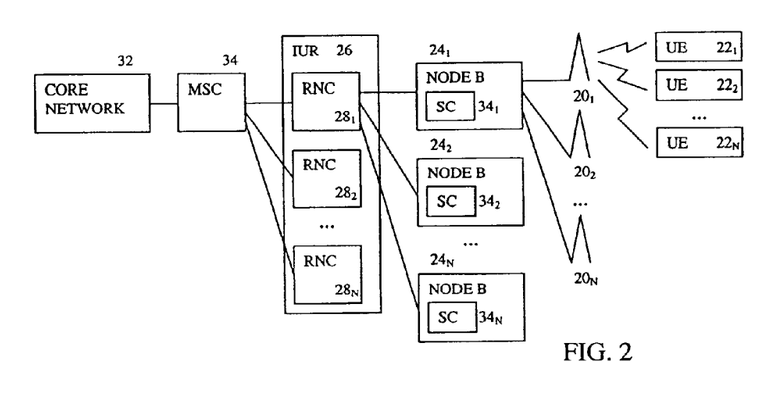
FIG. 2 is an illustration of a network layout of a wireless communication system.

A network perspective of a wireless communication system is shown in FIG. 2. Each node-B 24 within the system communicates with associated UEs 22 or users. Each node-B 24 has a single site controller (SC) 34 associated with either a single or multiple base stations 20. A group of node-Bs 24 is connected to a radio network controller (RNC) $28_1$. To transfer communications between RNCs 28, an interface between the RNCs (IUR) 26 is utilized. Each RNC 28 is connected to a mobile switching center (MSC) 30 which in turn is connected to the core network 32.

In code division multiple access (CDMA) communication systems, multiple communications can be sent over the same spectrum simultaneously. The multiple communications are distinguished by their codes. In time division duplex communication systems using CDMA (TDD/CDMA), the spectrum is time divided into repeating frames having time slots, such as fifteen time slots. In such systems, communications are sent in selected time slots using selected codes. A physical channel is defined as one code in one time slot. The use of a single code in a single time slot with a spreading factor of sixteen is referred to as a resource unit. Based on the type of service being provided to a user (UE 22) in the system, one or multiple physical channels may be assigned to support the users uplink and downlink communications.

Since multiple communications are simultaneously carried over the same frequency spectrum, one user's communications may interfere with another user's. To reduce such interference, transmission power control is used. In transmission power control, a transmission is sent at a power level so that only a desired reception quality is met, such as a signal to interference ratio (SIR), bit error rate (BER) or block error rate (BLER).

One transmission power control technique is open loop power control. In open loop power control, a transmitter's power level is determined using a pathloss estimate between the transmitter site and its desired receiver site. To estimate the pathloss, the receiver site transmits a signal and an indicator of the transmission power level of the signal. By subtracting the received power level from the transmitted power level of the signal, the pathloss is estimated. Using the pathloss estimate and a target signal to interference ratio (SIR), a transmission power level for the transmitter is set. The value of the target SIR is based on the service type. Another type of power control is closed loop power control. Closed loop power control sends power commands from the receiver site to adjust the transmitter's power level.

When a new user or user service is added to a system, the new user will create interference to existing users communicating at the same time. To maintain their desired signal quality, the existing users typically increase their transmission power levels. However, some transmitters may be near their transmission power limits. As a result, adding the new user may create an unacceptable quality of service (QOS) for existing users.

To evaluate whether a new user should be added to the system, it is desirable to estimate the transmission power levels of the existing users, after admission of the new user. If all of the users, including existing and the new user, are all safely within acceptable transmission power levels, the new user is admitted. If a user's transmission power level is unacceptable, such as by being over its transmission power level capabilities, the new user is not admitted.

Accordingly, it is desirable to have better transmission power estimations.

SUMMARY

A model for noise rise of users in relation to an interference measure, a pathloss and a desired signal to interference ratio is provided. For a selected user, a pathloss, an interference measure and a desired signal to interference ratio is determined. A noise rise for the selected user is determined using the determined interference measure, pathloss, desired signal to interference ratio and the noise rise model. The selected user transmission power level is estimated using the determined noise rise.

DETAILED DESCRIPTION OF THE PREFERRED EMBODIMENT(S)

Figure 3:
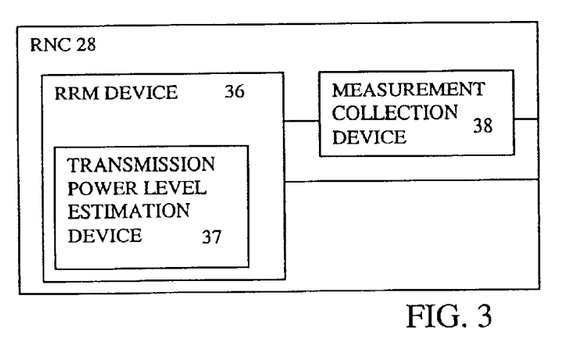
FIG. 3 is a simplified radio network controller for transmission power level estimation.

FIG. 3 is a simplified RNC 28 for use in transmission power level estimation. The RNC 28 has a RRM device 36 and a measurement collection device 38. The measurement collection device 38 collects various measurements from other components of the network, such as the node-Bs 24 and the UEs 22. These measurements include transmission power levels (both uplink and downlink), pathloss information and other information. The RRM device 36 uses the measurements in determining efficient assignment of resources which is sent to the other components. The RRM device has a transmission power level estimation block 37 for use in determining the estimated transmission power levels.

Figure 4:
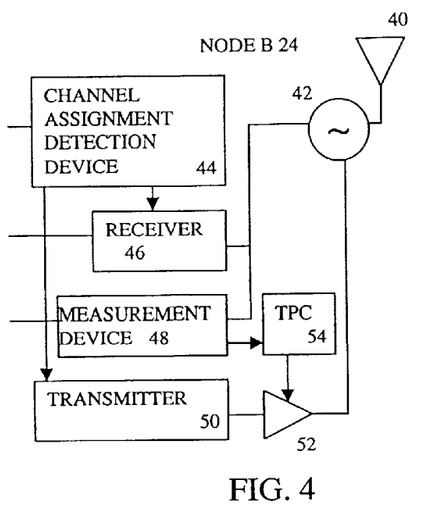
FIG. 4 is a simplified node-B for transmission power level estimation.

FIG. 4 is a simplified node-B 24 for use in transmission power level estimation. An antenna 40 receives radio frequency signals over a radio channel from the UEs 22. The received signals are passed through an isolator or switch 42 to a receiver 46 and a measurement device 48. A channel assignment device 44, which receives channel assignments from the RNC 28, identifies the physical channels and time slots to allow the receiver 46 to detect the transmitted data. The receiver 46 may be a multiuser detection device (MUD), a RAKE or a different type of receiver. The receiver 46 also recovers signaled information from the UE 22, such as measurement information, which is relayed to the RNC 28.

A measurement device 48 takes various measurements at the node-B 24, such as interference levels and reception power levels. These measurements are also relayed to the RNC 28. A transmitter 50 sends data and signaled information, such as channel assignments and a transmission power level of the node-B transmitter 24, to the UEs 22. The channel assignment device 44 determines a transmission power level for the node-B transmitter 50. The channel assignment device 44 controls the gain of an amplifier 52 to control the transmission power level. The transmitted signals pass through the isolator or switch 42 and are radiated by the antenna 40.

Figure 5:
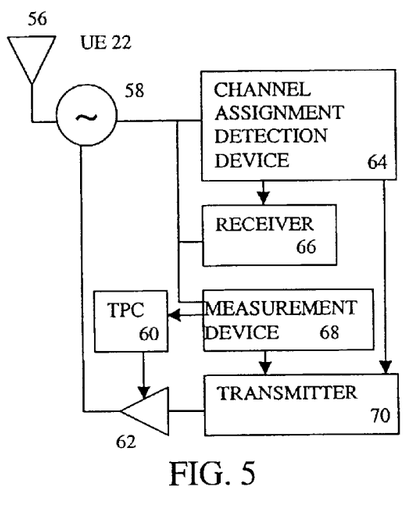
FIG. 5 is a simplified user equipment for transmission power level estimation.

FIG. 5 is a simplified UE 22 for use in RRM. An antenna 56 receives radio frequency signals over a radio channel from the node-B 24. The received signals are passed through an isolator or switch 58 to a receiver 66 and a measurement device 68. A channel assignment detection device 44 recovers the signaled information concerning the UE's channel assignments for both uplink and downlink. The receiver 66 may be a multiuser detection device (MUD), a RAKE or a different type of receiver.

A measurement device 68 takes various measurements at the UE 22, such as interference levels and reception power levels. These measurements are also relayed to the RNC 28 by being transmitted to the node-B 24. A transmitter 70 sends data and signaling information, such as measurements, pathloss information and a transmission power level of the UE transmitter 70, to the node-B 24. A transmit power controller (TPC) 60 determines a transmission power level for the node-B transmitter 60. The TPC 60 controls the gain of an amplifier 62 to control the transmission power level. The transmitted signals pass through the isolator or switch 58 and are radiated by the antenna 56.

The following is an approach to estimate new transmit power levels for users in a system after admission of a new user or user service. The system's users use transmission power control, such as open loop power control, to reduce interference between users.

The approach is explained in conjunction with W-CDMA TDD/CDMA system, where uplink and downlink transmissions are assigned separate time slots. The approach is also applicable to CDMA systems where uplink and downlink transmissions are separated by frequency spectrum and other hybrid time division multiple access (TDMA)/CDMA and TDD/CDMA systems where uplink and downlink communications are assigned separate time slots or frequency spectrum, by including the out of band attenuation factor in the pathloss.

Figure 8:
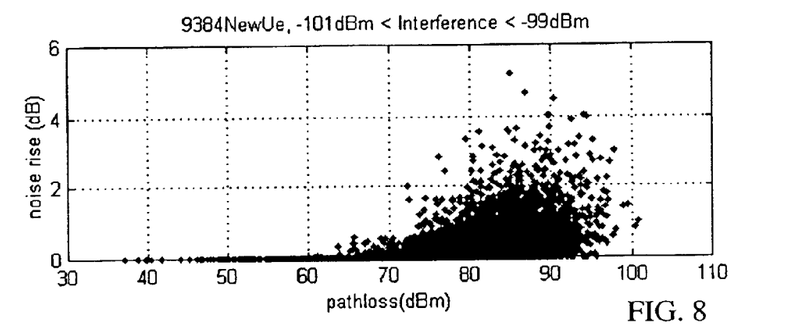
FIG. 8 is a plot of a simulation of noise rise versus pathloss.

For the analysis, the system as shown in FIG. 8 is divided into a region where for a particular time slot, M UEs 22 are served by N base stations 20. To simplify the analysis, it is assumed multi-user detection (MUD) receivers are used for both uplink and downlink reception, although the approach is extendable to other receivers, such as a RAKE receiver. Each base station 20 is assigned an index, such as j, where j=1, 2, ..., N. Each base station j has a set $\Omega(j)$ UEs 22 connected to it. Each UE 22 is assigned an index, such as i, where i=1, 2, ..., M. A new UE 22 or UE session, UE M+1, is to be added to the region. UE M+1 is proposed to be added to base station N.

For use in determining the transmit power levels for an uplink time slot, an $i^{th}$ UE's initial uplink transmit power level prior to the addition of the new user is defined as $T^0(i)$, where 0 indicates the initial transmit power level. The new user's power is determined, such as by Equation 5:

$$T^0(M+1) = PL_{M+1,n} \cdot ISCP_{M+1} \cdot SIR_{UL}(M+1) \qquad \text{Equation 5}$$

$PL_{M+1,n}$ is the pathloss between the M+1 user and the base station. This value is typically determined at the base station n by subtracting a received power level of a signal from the UE 22 from its transmission power level. Alternately, the pathloss is estimated from other UEs 22 at a similar distance from the base station 20. $ISCP_{M+1}$ is the interference as measured using interference signal code power (ISCP) at the UE receiver. This value is either measured at the UE 22 or estimated by ISCP measurements by other similarly situated users. The ISCP can be replaced in the analysis with other types of interference measurements. $SIR_{UL}(M+1)$ is the desired uplink signal to interference ratio at the base station for the M+1 user.

Figure 6:
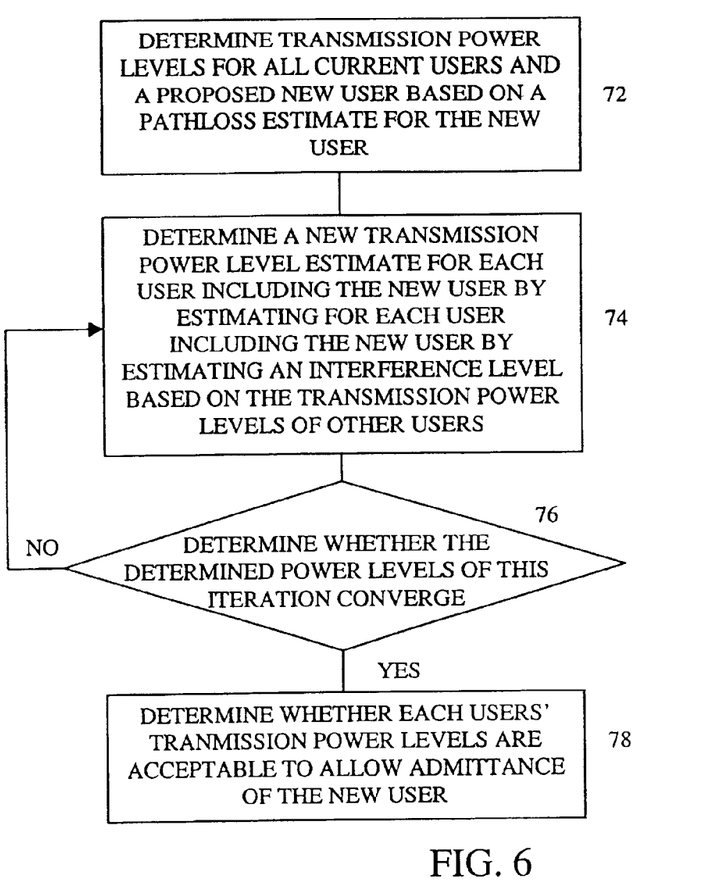
FIG. 6 is a flow chart for determining transmission power levels after admission for a new user or user service.

The other users initial transmit powers are typically known or are estimated, $T^0(1), \ldots, T^0(M)$. An initial power vector is constructed (72), such as by Equation 6:

$$T^0 = \begin{bmatrix} T^0(1) \\ T^0(2) \\ \cdots \\ T^0(M) \\ T^0(M+1) \end{bmatrix} \qquad \text{Equation 6}$$

Each users power level is iteratively adjusted to generate an estimate of the transmission power levels that each user will reach at equilibrium after introduction of the new user M+1.

The ISCP for each iteration as seen by user i is based on the transmission power of each user not in user i's cell divided by its estimated pathloss to user i's base station j. It is assumed that there is negligible cross-channel interference within each cell. This ISCP estimate is, preferably, used in an open loop type analysis to determine user i's power level for each iteration. One approach to calculated each $k^{th}$ iteration's power level for user I (74), is per Equation 7:

$$T^K(i) = PL_{i,j} \cdot ISCP^{K-1}(i) \cdot SIR_{UL}(i) \qquad \text{Equation 7}$$

$$= PL_{i,j} \cdot SIR_{UL}(i) \cdot \sum_{h=1, h \notin \Omega(j)}^{M+1} (T^{K-1}(h) / PL_{h,j})$$

If the location of each user is know, the pathloss can be estimated using the user's location. Otherwise, the pathloss is estimated based on a typical expected pathloss between that user's cell and user i's base station adjusted by the pathloss to that user's base station. Alternately, user i's base station i may calculate that user's pathloss.

To facilitate implementation of the iteration analysis, each iteration can be viewed as a vector multiplication, such as per Equation 8:

$$T^K = A \cdot T^{K-1} \qquad \text{Equation 8}$$

A is an (M+1)×(M+1) matrix. In matrix A, an element $A_{kl}$, where k is the row and l is the column and ($1 \leq k, 1 \leq M+1$) is given, such as per Equation 9:

$$A_{kl} = \begin{cases} 0, & \text{where } k \in \Omega(j), \\ & l \in \Omega(j) \\ (SIR_{UL}(k) \cdot PL_{k,j})/PL_{l,j}, & \text{where } k \in \Omega(j), \\ & l \in \Omega(h), j \neq h \end{cases} \quad \text{Equation 9}$$

The iterations are continued until the transmission power levels converge (76), such as per Equation 10:

$$\frac{|T^{K+1}(i) - T^K(i)|}{T^K(i)} \leq \delta, \text{ where } 1 \leq i \leq M+1 \quad \text{Equation 10}$$

$\delta$ is a convergence parameter, which is a small number, such as $1 \times 10^{-4}$. Alternately, a limit may be set to the number of iterations.

After convergence is met, each UE's estimated transmission power is checked against its capabilities. If all users have acceptable transmission power levels, the new user or service can be added (78). If some of the users exceed their capabilities or are unacceptably close to their capability limits, the new user or service is not admitted (78).

For the downlink time slots, the initial downlink transmission power levels are used to produce a downlink transmission power vector $T^0$ (72), such as per Equation 11:

$$T^0 = \begin{bmatrix} T^0(1) \\ T^0(2) \\ \cdots \\ T^0(M) \\ T^0(M+1) \end{bmatrix} \quad \text{Equation 11}$$

The M+1 user is proposed to be admitted to the $N^{th}$ base station. The values for $T^0(i), \ldots T^0(M)$ are known or measured at their respective base stations 20. $T^0(M+1)$ is determined such as per Equation 12:

$$T^0(M+1) = PL_{M+1,n} \cdot ISCP_{M+1} \cdot SIR_{DL}(M+1) \quad \text{Equation 12}$$

$PL_{M+1,n}$ is the measured pathloss between base station n and user M+1 or the pathloss is estimated based on other users similarly situated. $ISCP_{M+1}$ is the measured ISCP or another interference measure at user M+1, prior to admission. This value may also be estimated based on other users similarly situated. $SIR_{DL}(M+1)$ is the desired received downlink SIR at user M+1.

Each user's downlink power level is iteratively estimated (74), after introduction of the new user M+1. One approach to calculate each $K^{th}$ iteration for an $i^{th}$ user is per Equation 13:

$$T^K(i) = PL_{i,j} \cdot ISCP^{K-1}(i) \cdot SIR_{DL}(i) \quad \text{Equation 13}$$

$$= PL_{i,j} \cdot SIR_{DL}(i) \cdot \sum_{h \in \Omega(L), L=1,2,\ldots,N, L \neq j}^{M+1} (T^{K-1}(h)/PL_{L,j})$$

L represents all other base stations 20 besides base station j of the $i^{th}$ user. To facilitate implementation, determining each iteration, K, can be viewed as a vector multiplication such as per Equation 14:

$$T^K = B \cdot T^{K-1} \quad \text{Equation 14}$$

$T^K$ is the determined transmission power levels. $T^{K-1}$ is the determined power level of the preceding iteration. B is a (M+1)×(M+1) matrix. For an element at the $r^{th}$ row and $s^{th}$ column of B, such that $1 \leq r, s \leq M+1$), $B_{rs}$ is determined per Equation 15:

$$B_{rs} = \begin{cases} 0 & r \in \Omega(j), s \in \Omega(j) \\ (SIR_{DL}(r) \cdot PL_{r,j})/PL_{r,i} & r \in \Omega(j), s \in \Omega(l), j \neq l \end{cases} \quad \text{Equation 15}$$

The iterations are continued until the transmission power levels converge (76), such as per Equation 16:

$$\frac{|T^{K+1}(i) - T^K(i)|}{T^K(i)} \leq \delta, \text{ where } 1 \leq i \leq M+1 \quad \text{Equation 16}$$

$\delta$ is a convergence parameter, which is a small number, such as $1 \times 10^{-4}$. The convergence parameter for the downlink may be the same or different than the uplink convergence parameter.

After convergence is met, estimated downlink transmission power is checked against the base station's transmission capabilities. If all transmitters 50 will be within acceptable transmission power levels, the new user can be admitted (78). If some of the transmitters 50 exceed their transmission power level limit or are unacceptably close to the limit, the new user is not admitted (78).

In some systems, all of the measurements required for the procedure of FIG. 6 may not be available. One approach to determine the increase in transmission power as a result of a new assignment using noise rise is per FIG. 7. The noise rise as a result of an assignment depends on the pathloss, the measured interference (I), such as measured using ISCP, and the SIR target for the transmitter of interest. As a result, empirically, the noise rise can be estimated.

Figure 7:
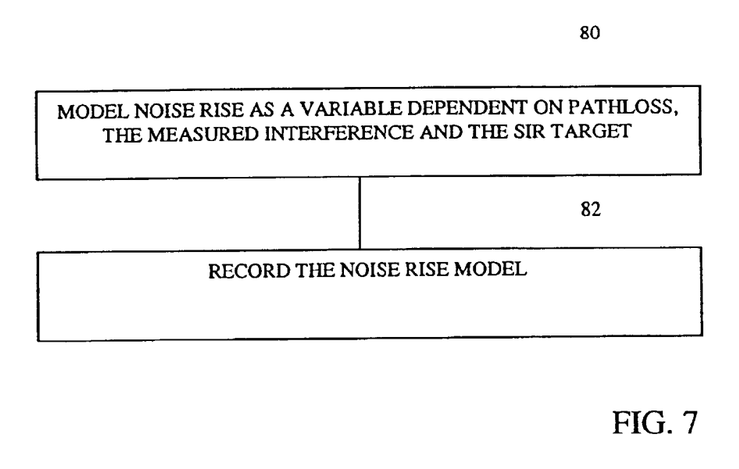
FIG. 7 is a flowchart of determining transmission power levels using noise rise.

The noise rise is modeled as a variable depending on the pathloss, the measured interference, and the SIR target. Using either simulation or field data, a noise rise model is developed (80). The data can be collected and updated during the system normal operation. The modeled noise rise may be stored as a table or a mathematical relationship (82), such as a curve or series of curves.

One equation for estimating noise rise is per Equation 17:

$$\text{Noise rise} = \Delta I(I, \text{pathloss}, SIR_{TARGET}) \quad \text{Equation 17}$$

Figure 9:
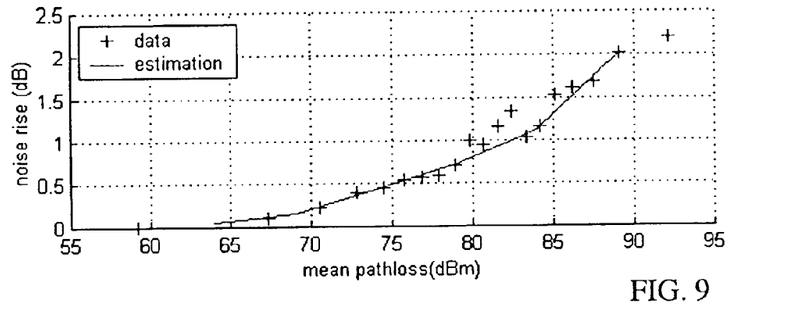
FIG. 9 is a graph of a simulation of noise rise versus mean pathloss.

The noise rise is modeled as a change in the measure interference (I), $\Delta I$. $\Delta I$ is a function of the measured interference, the pathloss and the target SIR. FIGS. 8 and 9 illustrate obtaining a curve fitting the noise rise using simulation results for only the pathloss for simplicity. Data for the noise rise estimation can be obtained, including during the system normal operation, in the following way. Initially, a high fixed margin is used for resource allocation. Before every allocation, the interference level is recorded. After allocation, allowing the power control loops to adjust, the interference is measured again and compared to the before allocation value. The difference is tabulated as a function of the pathloss to the user, the before allocation interference and the required target SIR of the user. After a sufficient number of collections, a smoothing operation is used to create a final table or mathematical relationship, such as a formula.

Alternately, a generic table or mathematical relationship, such as derived from simulations, is used. The generic table or relationship is refined or updated during the normal system operations.

FIG. 8 illustrates the simulated results of noise rise versus the pathloss. FIG. 9 illustrates a curve representing the noise rise versus the mean pathloss. As a result, the noise rise for a transmitter can be estimated from that transmitter's pathloss.

The transmitter power level for a transmitter is determined using the estimated noise rise, such as per Equation 18:

Transit Power = Interference Measure + Pathloss + $SIR_{TARGET}$ + Noise Rise + Measurement Error Margin    Equation 18

The Measurement Error Margin is a design parameter used to compensate for measurement errors. The Measurement Error Margin is typically set at a conservatively high value to allow an adequate margin.

Figure 10:
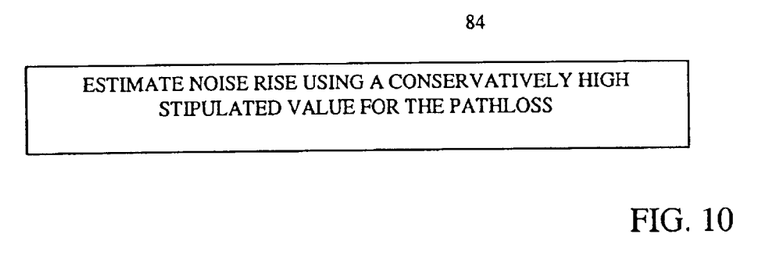
FIG. 10 is a flowchart of compensating for missing pathloss information.

Under certain conditions, information concerning the transmitter's pathloss may not be available, as shown in FIG. 10. Missing pathloss information may result in uplink time slots, where the UE transmission power level is unavailable for the pathloss calculation. To estimate the noise rise in such situations, a conservatively high stipulated value for the pathloss, $\overline{pathloss}$, is used (84). Using a high stipulated value, effectively overestimates the noise rise. Accordingly, the resulting determined transmission power levels are typically overstated. The noise rise is determined using Equation 19:

Noise Rise=$\Delta I(I, \overline{pathloss}, SIR_{TARGET})$    Equation 19

The stipulated value for the $\overline{pathloss}$ may be a set value or a cell dependent parameter based on cell range and propagation conditions.

What is claimed is:

1. A method for estimating a transmission power level of a selected user in a code division multiple access communication system, the method comprising:

providing a model for noise rise of users in relation to an interference measure, a pathloss and a desired signal to interference ratio;

determining a pathloss and a desired signal to interference ratio for the selected user;

determining a noise rise for the selected user using the determined interference measure, pathloss, desired signal to interference ratio and the noise rise model; and estimating the selected user transmission power level using the determined noise rise.

2. The method of claim 1 wherein the estimated selected user transmission power level is estimated in part by adding the interference measurement, the pathloss and the desired SIR of the selected user to the determined noise rise.

3. The method of claim 2 wherein a measurement error margin is included in the estimated selected user transmission power level.

4. The method of claim 1 wherein the interference measure of the selected user is measured using ISCP.

5. The method of claim 1 further comprising generating the noise rise model and storing the noise rise model as a table.

6. The method of claim 1 further comprising generating the noise rise model and storing the noise rise model as a mathematical relationship.

7. The method of claim 1 wherein the determined pathloss for the selected user is measured.

8. The method of claim 1 wherein the determined pathloss for the selected user is a stipulated value which overestimates a pathloss.

9. The method of claim 1 wherein the system is a time division duplex communication system using CDMA and the selected user estimated transmission power level is for a single time slot.

10. A radio network controller (RNC) for estimating a transmission power level of a selected user in a code division multiple access communication system, the RNC comprising:

a radio resource management device for determining an interference measure, a pathloss and a desired signal to interference ratio (SIR) for the selected user, determining a noise rise for the selected user using the determined interference measure, pathloss, desired SIR and a noise rise model, and estimating the selected user transmission power level using the determined noise rise; wherein the noise rise model uses variables including an interference measure, a pathloss and a desired SIR.

11. The RNC of claim 10 further comprising a measurement collection device for receiving the interference measure, the pathloss and the desired SIR for the selected user.

12. The RNC of claim 10 wherein the CDMA communication system is a time division duplex communication system using CDMA and the estimating transmission power levels is performed in a single time slot.

13. The RNC of claim 10 wherein the new user estimated transmission power level is estimated by adding a pathloss, an interference measurement and a target signal to interference ratio of the new user.

14. The RNC of claim 10 wherein the noise rise model is stored as a table.

15. The RNC of claim 10 wherein the noise rise model is stored as a mathematical relationship.

16. The RNC of claim 10 wherein the determined pathloss for the selected user is a stipulated value which overestimates a pathloss.

17. The RNC of claim 10 wherein the determined pathloss for the selected user is measured.

18. A radio network controller (RNC) for estimating a transmission power level of a selected user in a code division multiple access communication system, the RNC comprising:

means for determining an interference measure, a pathloss and a desired signal to interference ratio (SIR) for the selected user;

means for determining a noise rise for the selected user using the determined interference measure, pathloss, desired SIR and a noise rise model, the noise rise model uses variables including an interference measure, a pathloss and a desired SIR; and means for estimating the selected user transmission power level using the determined noise rise.

19. The RNC of claim 18 wherein each last estimate is compared to a transmission power level capability associated with the user of that last estimate to determine whether to admit the new user.

20. The RNC of claim 18 wherein the system is a time division duplex communication system using CDMA and the selected user estimated transmission power level is for a single time slot.

* * * * *

UNITED STATES PATENT AND TRADEMARK OFFICE
CERTIFICATE OF CORRECTION

PATENT NO.     : 6,850,500 B2                                        Page 1 of 1
DATED          : February 1, 2005
INVENTOR(S)    : Zeira et al.

It is certified that error appears in the above-identified patent and that said Letters Patent is hereby corrected as shown below:

Column 3,
Line 27, after "detection device", delete "44", insert -- 64 --.
Line 40, after "transmitter", insert -- 50 --.

Signed and Sealed this

Twenty-seventh Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,850,500 B2
DATED : February 1, 2005
INVENTOR(S) : Zeira et al.

It is certified that error appears in the above-identified patent and that said Letters Patent is hereby corrected as shown below:

Drawings,
Sheet 4, delete Figure 6 and insert new attached Figure 6.

Signed and Sealed this

Eighteenth Day of April, 2006

JON W. DUDAS
*Director of the United States Patent and Trademark Office*

FIG. 6